US012080969B2

(12) United States Patent
Sasaki

(10) Patent No.: US 12,080,969 B2
(45) Date of Patent: Sep. 3, 2024

(54) ELECTRICAL CONNECTOR WITH A RECEPTACLE IN A FIRST CASE AND A MATING PLUG INTEGRATED WITH A SECOND CASE

(71) Applicant: Hosiden Corporation, Yao (JP)

(72) Inventor: Daisuke Sasaki, Yao (JP)

(73) Assignee: HOSIDEN CORPORATION, Yao (JP)

(*) Notice: Subject to any disclaimer, the term of this patent is extended or adjusted under 35 U.S.C. 154(b) by 14 days.

(21) Appl. No.: 17/466,481

(22) Filed: Sep. 3, 2021

(65) Prior Publication Data

US 2022/0158383 A1 May 19, 2022

(30) Foreign Application Priority Data

Nov. 13, 2020 (JP) ................................ 2020-189280

(51) Int. Cl.

| | |
|---|---|
| ***H01R 13/516*** | (2006.01) |
| ***H01R 13/405*** | (2006.01) |
| ***H01R 24/50*** | (2011.01) |
| *H01R 13/512* | (2006.01) |
| *H01R 13/518* | (2006.01) |
| *H01R 13/52* | (2006.01) |
| *H01R 103/00* | (2006.01) |
| *H04N 7/10* | (2006.01) |
| *H04N 23/51* | (2023.01) |

(52) U.S. Cl.

CPC ......... *H01R 13/516* (2013.01); *H01R 13/405* (2013.01); *H01R 24/50* (2013.01); *H01R 13/512* (2013.01); *H01R 13/518* (2013.01); *H01R 13/5208* (2013.01); *H01R 2103/00* (2013.01); *H01R 2201/26* (2013.01); *H04N 7/10* (2013.01); *H04N 23/51* (2023.01)

(58) Field of Classification Search

CPC .... H01R 13/516; H01R 13/405; H01R 24/50; H01R 13/512; H01R 13/518; H01R 13/5208; H01R 2103/00; H01R 2201/26; H04N 5/2252; H04N 7/10; H04N 23/51

See application file for complete search history.

(56) References Cited

U.S. PATENT DOCUMENTS

| | | | | |
|---|---|---|---|---|
| 2015/0056871 A1* | 2/2015 | Sasaki | H01R 13/516 439/722 |
| 2015/0325964 A1 | 11/2015 | Kunieda et al. | |
| 2017/0126945 A1 | 5/2017 | Shiraishi et al. | |

FOREIGN PATENT DOCUMENTS

| | | | |
|---|---|---|---|
| JP | 2015-179568 A | 10/2015 | |
| JP | 5994814 | 9/2016 | |
| JP | 2017-83756 A | 5/2017 | |
| WO | WO-2006117892 A1 * | 11/2006 | G03B 17/00 |
| WO | WO-2006131723 A1 * | 12/2006 | H01R 13/518 |

OTHER PUBLICATIONS

Japanese Office Action dated Jan. 31, 2024 issued in corresponding Japanese application No. 2020-189280; English translation included (6 pages).

* cited by examiner

*Primary Examiner* — Justin M Kratt

(74) *Attorney, Agent, or Firm* — Rankin, Hill & Clark LLP

(57) ABSTRACT

A connector includes a receptacle attached to a rear substrate accommodated in a front case, and a plug attached to one end of a coaxial cable, integrated with a rear case assembled to the front case, and fitted to the receptacle. A separate cable different from the coaxial cable integrated with the rear case together with the plug is integrated with the rear case.

5 Claims, 9 Drawing Sheets

ELECTRICAL CONNECTOR WITH A RECEPTACLE IN A FIRST CASE AND A MATING PLUG INTEGRATED WITH A SECOND CASE

BACKGROUND OF THE INVENTION

(1) Field of the Invention

The present invention relates to a connector, and particularly to a connector suitable for an in-vehicle camera.

(2) Description of Related Art

In a moving object such as a vehicle, an imaging device is frequently used for assisting driving, ensuring safety, recording a driving status, and the like. As such an in-vehicle camera, there has been known an in-vehicle camera of a power superposition system, the in-vehicle camera including a first case that has a lens window at one end and an opening at the other end, a substrate to which a receptacle electrically connected to an imaging element is attached and that is accommodated in the first case, and a second case that is integrated with a plug attached to one end of a coaxial cable and closes the opening when the plug is fitted to the receptacle, in which the receptacle and the plug constitute a connector, the first case and the second case are fixed to each other by ultrasonic bonding or an adhesive and thus are assembled in a state where the coaxial cable and the substrate are electrically connected via a connector, and a video signal, a power supply, and a synchronization control signal are transmitted by one coaxial cable (see, for example, Japanese Patent No. 5,994,814).

A conventional connector has a structure including a receptacle attached to a substrate accommodated in a first case and a plug attached to one end of a cable, integrated with a second case assembled to the first case, and fitted to the receptacle, and the conventional connector is intended to simplify and stabilize an electrical connection structure and work in an in-vehicle camera. However, since there is only one cable, there is a problem that it is difficult to meet market requirements for enabling product variations and complex use.

SUMMARY OF THE INVENTION

An object of the present invention is to provide a connector that can easily meet market requirements for enabling product variations and complex use.

A connector of the present invention includes a receptacle attached to a substrate accommodated in a first case, and a plug attached to one end of a cable, integrated with a second case assembled to the first case, and fitted to the receptacle, in which a separate cable different from the cable integrated with the second case together with the plug is integrated with the second case.

In the connector of the present invention, the separate cable different from the cable integrated with the second case together with the plug is integrated with the second case, and this configuration enables product variations and complex use while effectively utilizing an existing structure and reducing costs, and thus can enhance versatility.

Further, in the connector of the present invention, it is preferable to add a configuration in which the plug is integrated at a position eccentric from a center of the second case. In this additional configuration, the receptacle can be attached to near an end of the substrate to increase a degree of freedom in substrate design, and this can contribute to downsizing of the substrate, downsizing of the first case and the second case, and downsizing of the in-vehicle camera (device). Further, a large space is provided in a direction opposite to a plug eccentric direction from the center of the second case, and the separate cable can be integrated while an increase in size of the second case is prevented. This can contribute to prevent or reduce an increase in size of the first case and the second case and an increase in size of the in-vehicle camera (device).

In the connector of the present invention, as an additional configuration, the second case is preferably provided with a plurality of screw insertion holes through which a plurality of screws that fasten the second case to the first case are inserted, and the screw insertion holes preferably have a diameter that is smaller than a diameter of heads of the screws and is larger than a diameter of a plurality of screw holes provided in the first case and with which the screws are screwed while being inserted through the screw insertion holes. With this additional configuration, even when slight misalignment occurs between the first case and the second case due to fitting between the receptacle and the plug, the second case can be assembled to the first case while allowing the misalignment.

The present invention can provide a connector that can easily meet market requirements for enabling product variations and complex use.

DETAILED DESCRIPTION OF PREFERRED EMBODIMENTS

Hereinafter, a connector according to an embodiment of the present invention will be described with reference to the drawings.

Figure 1:
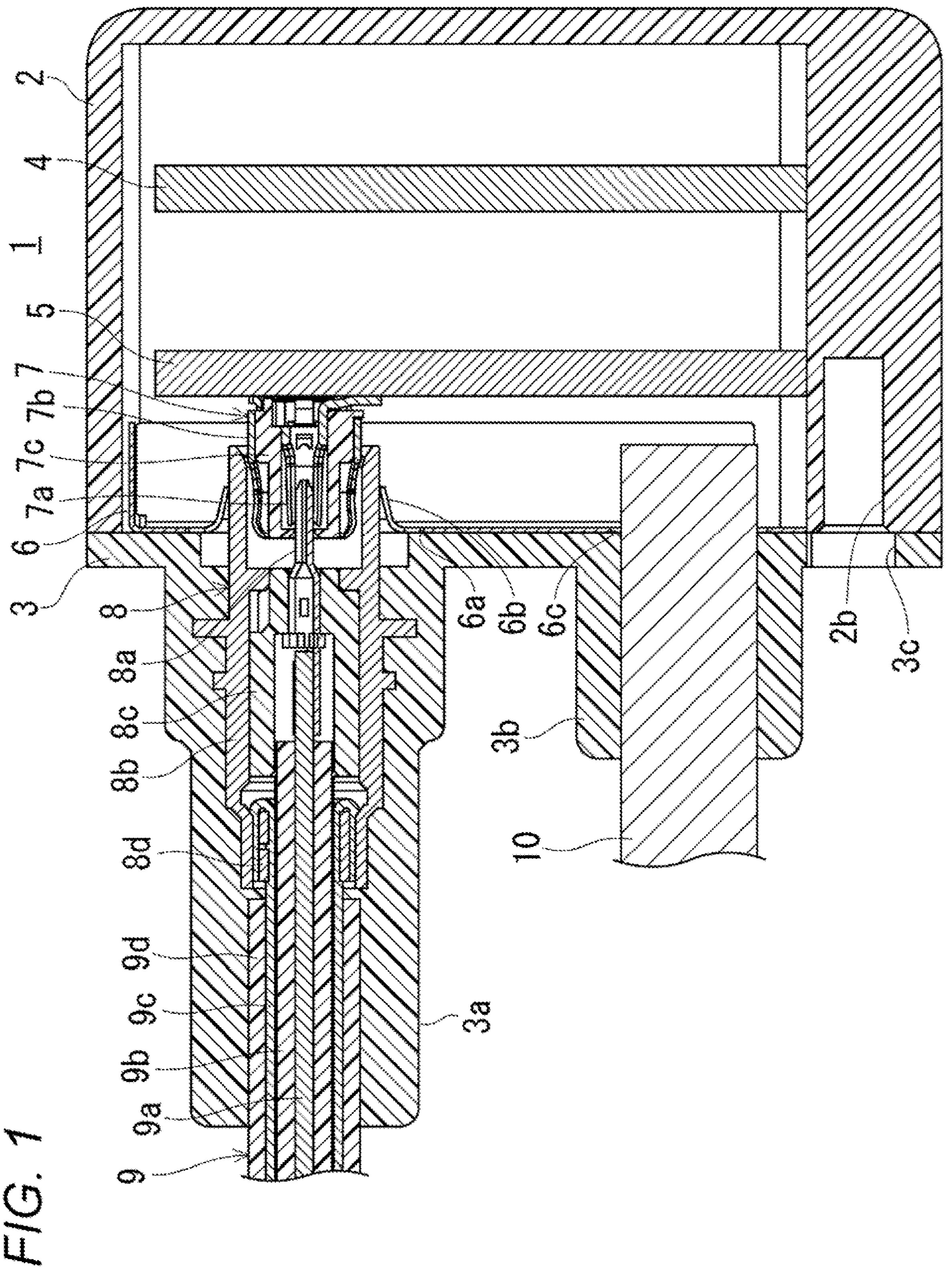
FIG. 1 is a sectional view taken along line A-A illustrated in FIG. 2 of an in-vehicle camera to which a connector according to an embodiment of the present invention is applied.

As illustrated in FIG. 1, the connector according to this embodiment is applied to an in-vehicle camera 1 as illustrated in FIGS. 1 to 7. First, the in-vehicle camera 1 includes a front case 2, a rear case 3, a front substrate 4, a rear substrate 5, a rear shield case 6, a receptacle 7, a plug 8, a coaxial cable 9, and a separate cable 10. Here, the front case 2 corresponds to a first case (accommodating at least one substrate) in the connector of the present invention. Similarly, the rear case 3 corresponds to a second case in the connector of the present invention, the rear substrate 5 corresponds to a substrate in the connector of the present invention, the receptacle 7 corresponds to a receptacle in the connector of the present invention, the plug 8 corresponds to a plug in the connector of the present invention, the coaxial cable 9 corresponds to a cable in the connector of the present invention, and the separate cable 10 corresponds to a separate cable in the connector of the present invention.

The front case 2 and the rear case 3 constitute a rectangular parallelepiped camera case, and the front case 2 constitutes a portion excluding a rear wall of the camera case, has a lens window (not illustrated) on a front wall, and has an opening 2*a* at a rear end. The rear case 3 constitutes a rear wall of the camera case, has a rectangular plate shape, and is assembled to the rear end of the front case 2 so as to close the opening 2*a* at the rear end of the front case 2 when the plug 8 is fitted to the receptacle 7. The front case 2 and the rear case 3 respectively include resin.

Each of the front substrate 4 and the rear substrate 5 is a printed circuit board (PCB), is accommodated and disposed in the front case 2 in parallel with the front wall, and is electrically connected via a flexible printed wiring board (FPC) (not illustrated) to constitute a camera module. On the front substrate 4, an imaging element such as a CCD or CMOS (not illustrated) is mounted, a lens member (not illustrated) is attached, and an electronic circuit that controls driving of the imaging element and processes a video signal output from the imaging element is formed. The receptacle 7 is mounted on the rear substrate 5.

When the plug 8 is fitted to the receptacle 7, the rear shield case 6 constitutes a rectangular parallelepiped shield case surrounding a camera module in the camera case together with a front shield case (not illustrated). The front shield case includes a metal plate, has a rectangular cylindrical shape with a top, is fixed in the front case 2, and has a lens exposure opening facing the lens window in a top plate facing the front wall of the front case 2. The rear shield case 6 includes a metal plate, has a bottomed rectangular cylindrical shape lower in height than the front shield case, and is fixed in a state where a bottom plate is joined to a front surface of the rear case 3. The bottom plate includes a plug insertion hole 6*a* through which a distal end (front end) of a conductive shell 8*b* of the plug 8 is inserted, a plurality of contact pieces 6*b* rising forward from a peripheral edge of the plug insertion hole 6*a* and elastically contacting the distal end of the conductive shell 8*b* of the plug 8 in a state of surrounding the distal end of the conductive shell 8*b* of the plug 8, and a cable insertion hole 6*c* through which the separate cable 10 is inserted. When the plug 8 is fitted to the receptacle 7, the rear shield case 6 is electrically connected to the front shield case, and the shield case, the conductive shell 8*b* of the plug 8, and an outer conductor 9*c* of the coaxial cable 9 are integrated as a shield to exhibit high shielding properties.

The receptacle 7 includes a cylindrical inner contact 7*a* including a metal plate, a cylindrical outer contact 7*b* including a metal plate and coaxially surrounding the inner contact 7*a*, and an insulator 7*c* including a resin and electrically insulating the inner contact 7*a* and the outer contact 7*b*. When the receptacle 7 is mounted on the rear substrate 5, the inner contact 7*a* is electrically connected to a signal pattern, and the outer contact 7*b* is electrically connected to a ground pattern of the substrate 7.

The plug 8 includes a pin-shaped central conductor 8*a* including a metal plate, and inserted into the inner contact 7*a*, being in contact with the inner contact 7*a*, and conductively connected to the inner contact 7*a* when fitted to the receptacle 7, a cylindrical conductive shell 8*b* including a metal and coaxially surrounding the central conductor 8*a*, and fitted to an outer part of the outer contact 7*b*, being in contact with the outer contact 7*b*, and conductively connected to the outer contact 7*b* when fitted to the receptacle 7, an insulator 8*c* including a resin and electrically insulating the central conductor 8*a* and the conductive shell 8*b*, and a metal caulking ring 8*d*. The plug 8 is caulked and fixed to one end of the coaxial cable 9.

The coaxial cable 9 includes an inner conductor 9*a* that is a metal core wire and is electrically connected to the central conductor 8*a* when the inner conductor 9*a* is attached to the plug 8, an inner sheath 9*b* that is a resin insulator covering an outer periphery of the inner conductor 9*a*, an outer conductor 9*c* that is metal braided covering an outer periphery of the inner sheath 9*b* and is electrically connected to the conductive shell 8*b* when attached to the plug 8, and an outer sheath 9*d* that is a resin insulator covering an outer periphery of the outer conductor 9*c*.

The separate cable 10 is, for example, a power supply cable.

The plug 8 (cable 9 with the plug 8) attached to one end of the coaxial cable 9 and the separate cable 10 are integrated with the rear case 3 by insert molding. At this time, in the plug 8, the distal end of the conductive shell 8*b* protrudes to the front surface of the rear case 3, a straight cylindrical first molded portion 3*a* integrally covering the conductive shell 8*b* protruding to a rear surface of the rear case 3 and one end of the outer sheath 9*d* of the coaxial cable 9 protrudes to the rear surface of the rear case 3. In the separate cable 10, one end of the separate cable 10 protrudes to the front surface of the rear case 3, a straight cylindrical second molded portion 3*b* integrally covering the protruding end of the separate cable 10 protruding to the rear surface of the rear case 3 protrudes to the rear surface of the rear case 3, and the coaxial cable 9 and the separate cable 10 are each pulled out straight from the rear surface of the rear case 3 toward a rear side.

In a state where, of the distal end of the conductive shell 8*b* of the plug 8 protruding to the front surface of the rear case 3 and one end of the separate cable 10 after insert molding, the distal end of the conductive shell 8*b* of the plug 8 is inserted through the plug insertion hole 6*a* and one end of the separate cable 10 is inserted through the cable insertion hole 6*c*, and in a state where the bottom plate is joined to the front surface of the rear case 3, the rear shield case 6 is fixed and is integrated with the rear case 3 similarly to the plug 8, the coaxial cable 9, and the separate cable 10. At this time, the distal end of the conductive shell 8*b* of the plug 8 and one end of the separate cable 10 each protrude toward inside of the rear shield case 6, and the conductive shell 8*b* of the plug 8 is electrically connected to the rear shield case 6 via the plurality of contact pieces 6*b*.

The plug 8 (cable 9 with the plug 8) attached to one end of the coaxial cable 9 and the separate cable 10 are integrated with the rear case 3 by insert molding. At this time, the plug 8 is integrated at a position eccentric from a center of the rear case 3. The separate cable 10 is integrated at a position eccentric from the center of the rear case 3 in a direction opposite to a plug eccentric direction. In an illustrated example, the plug 8 is integrated at a position eccentric from the center of the rear case 3 toward an obliquely upper left corner in FIG. 2, and the separate cable 10 is integrated at a position eccentric from the center of the rear case 3 toward an obliquely lower right corner in FIG. 2. That is, the plug 8 and the separate cable 10 are integrated at two positions separated from each other in one diagonal direction of the rear case 3.

The receptacle 7 is mounted near an end of the rear substrate 5 so as to be positioned coaxially with the plug 8 when the rear case 3 is assembled to the rear end of the front case 2 so as to close the opening at the rear end of the front case 2. In an illustrated example, the receptacle 7 is mounted at a position eccentric from the center of the rear substrate 5 toward an obliquely upper left corner in FIG. 4.

The rear case 3 is fixed to the front case 2 using two screws (external threads with head such as vis screws) (not illustrated). The front case 2 is provided with two screw holes 2*b* with which the two screws are screwed. The rear case 3 is provided with two screw insertion holes 3*c* causing the two screws to be screwed with the screw holes 2*b* while the two screws are inserted through the screw insertion holes 3*c*. The screw insertion holes 3*c* have a diameter that is smaller than a diameter of heads of the screws and is larger than a diameter of the screw holes 2*b* such that even when slight misalignment occurs between the front case 2 and the rear case 3 due to fitting between the receptacle 7 and the plug 8, the rear case 3 can be assembled to the front case 2 while allowing the misalignment.

Figure 2:
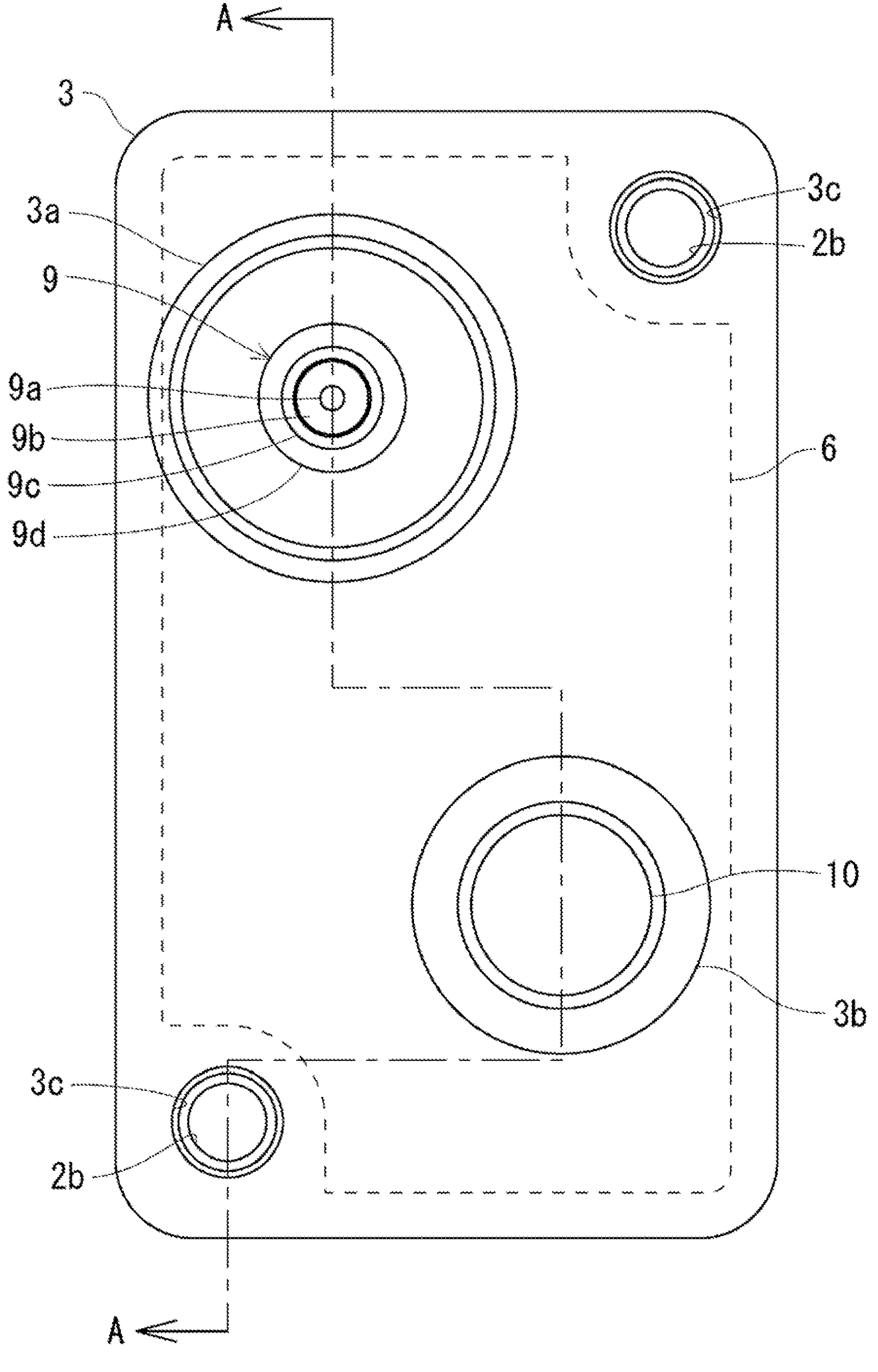
FIG. 2 is a back view (rear view) of the in-vehicle camera to which the connector according to the embodiment of the present invention is applied.
Figure 3:
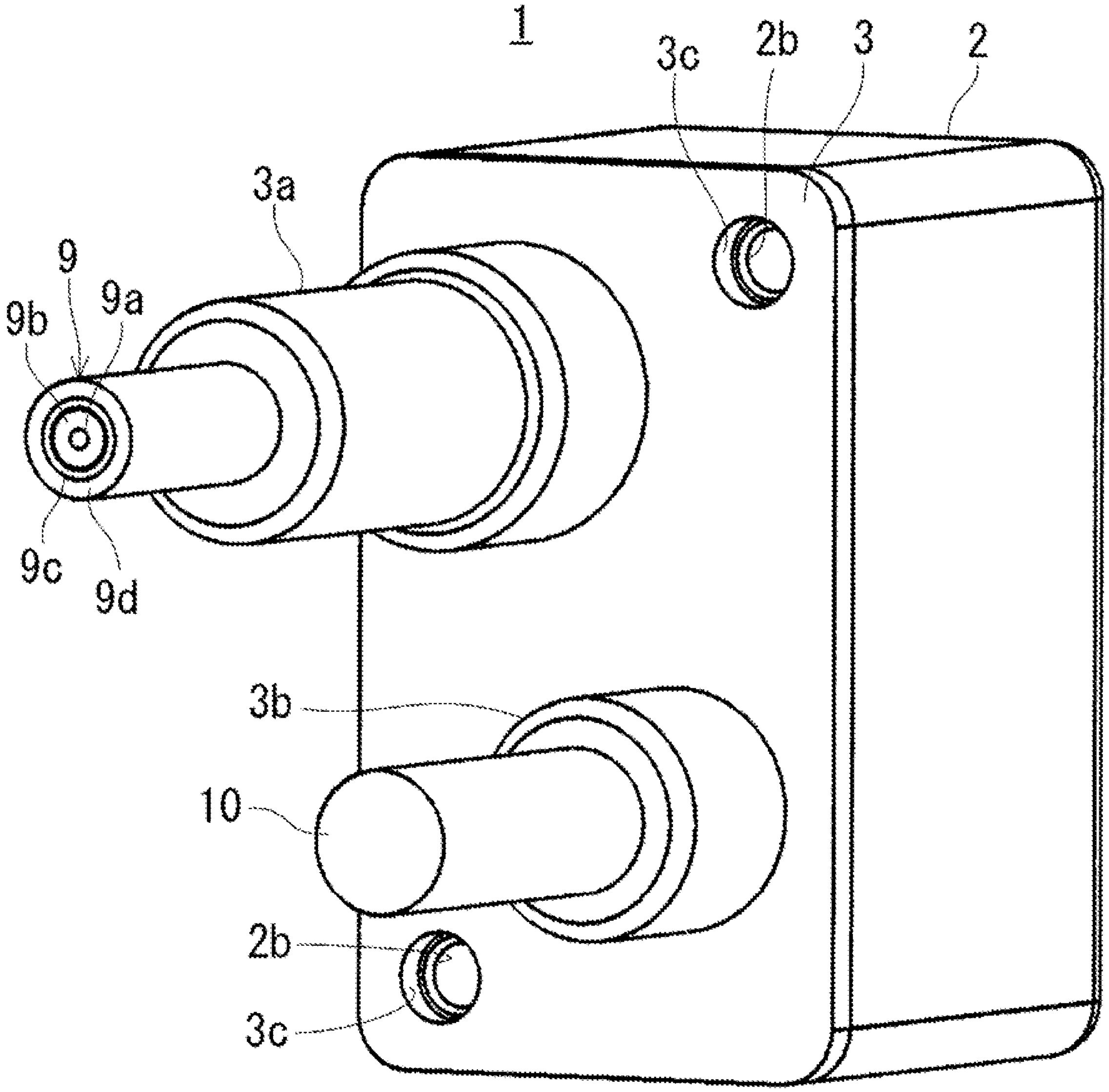
FIG. 3 is a perspective view of the in-vehicle camera to which the connector according to the embodiment of the present invention is applied, as viewed obliquely from behind.
Figure 4:
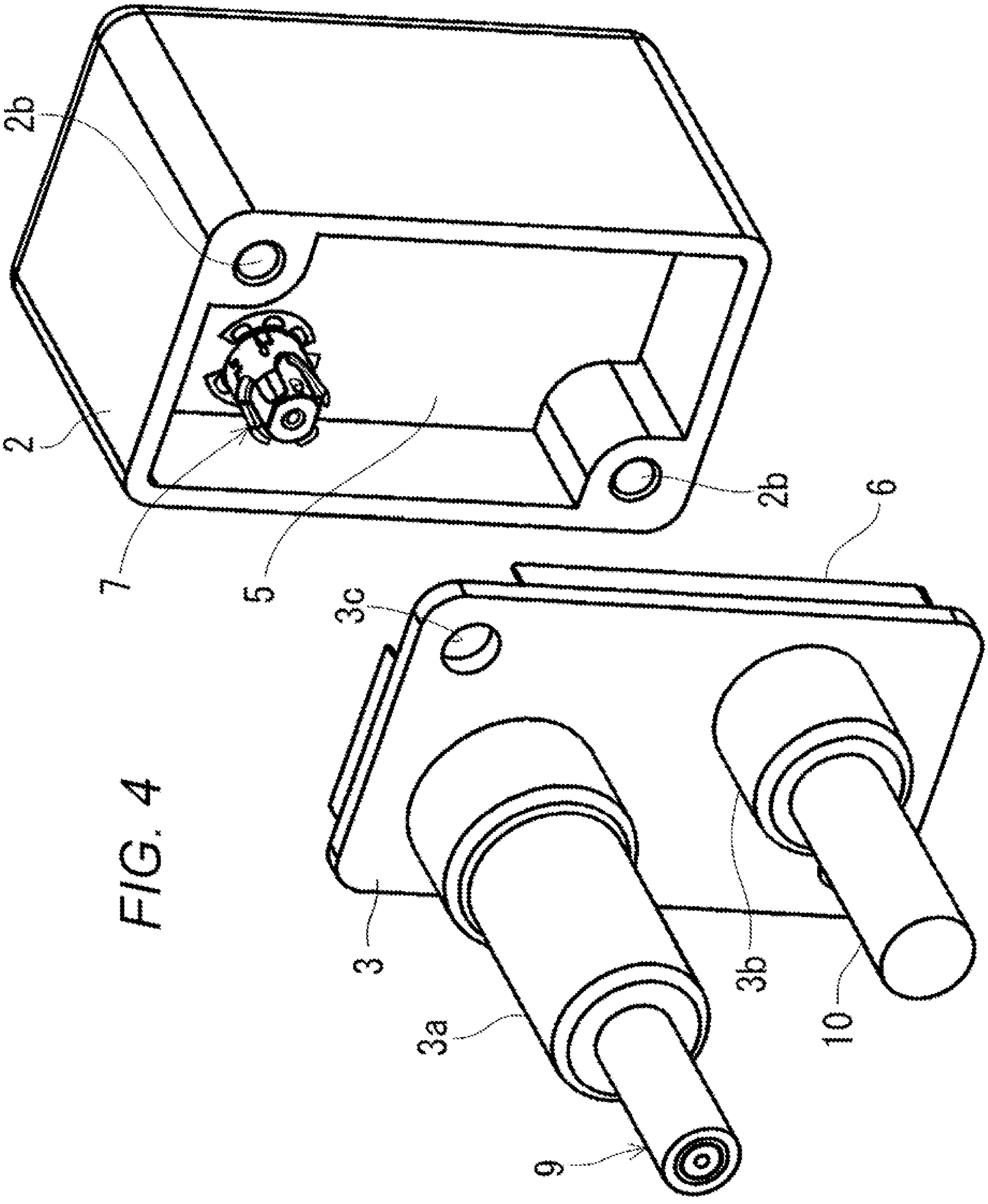
FIG. 4 is a perspective view of the in-vehicle camera to which the connector according to the embodiment of the present invention is applied in a state where the in-vehicle camera is disassembled into a structure on a first case side and a structure on a second case side, as viewed obliquely from behind.
Figure 5:
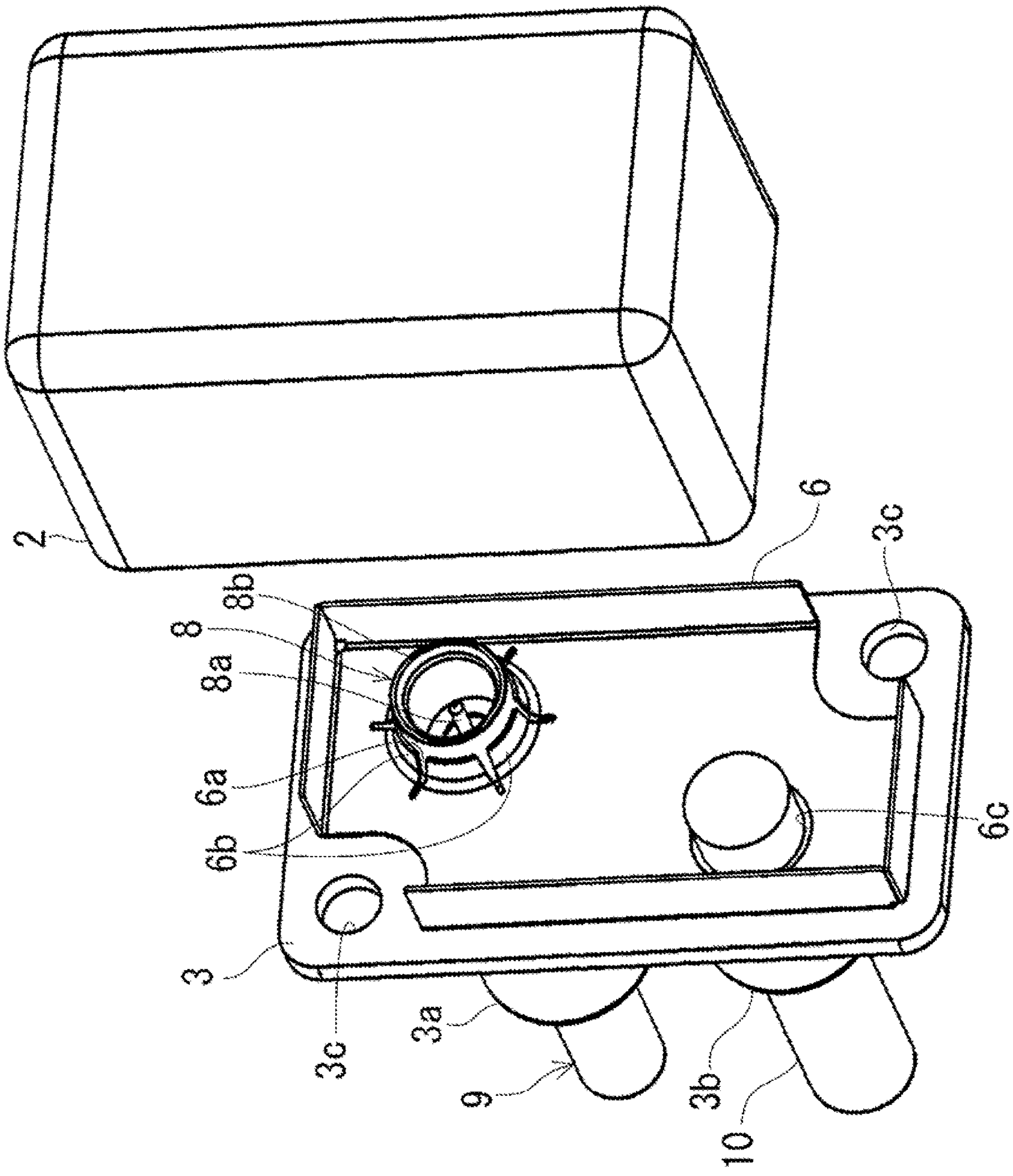
FIG. 5 is a perspective view of the in-vehicle camera to which the connector according to the embodiment of the present invention is applied in the case where the in-vehicle camera is disassembled into the structure on the first case side and the structure on the second case side, as viewed obliquely from the front.
Figure 6:
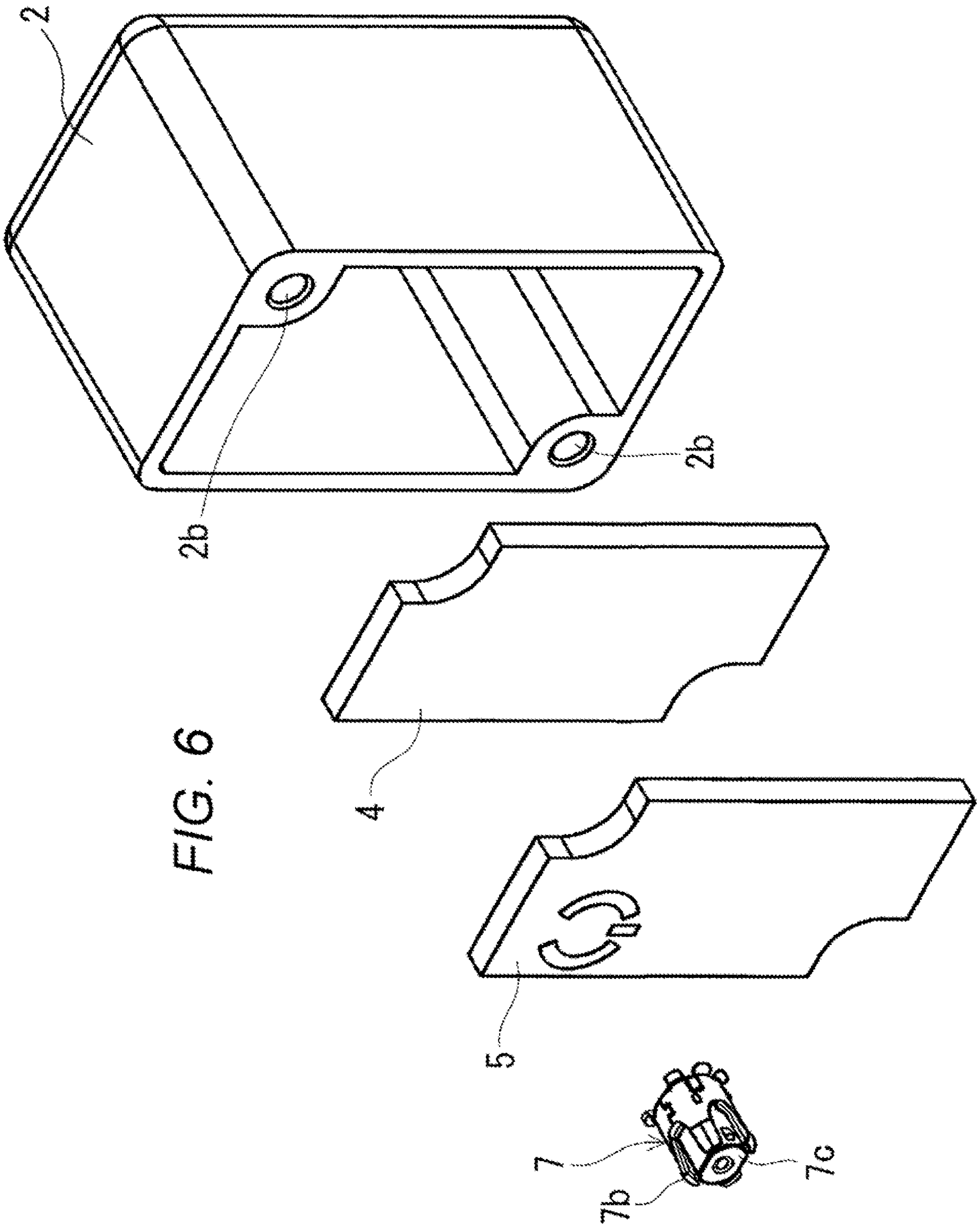
FIG. 6 is a perspective view illustrating the structure on the first case side illustrated in FIG. 4 in a disassembled state.
Figure 7:
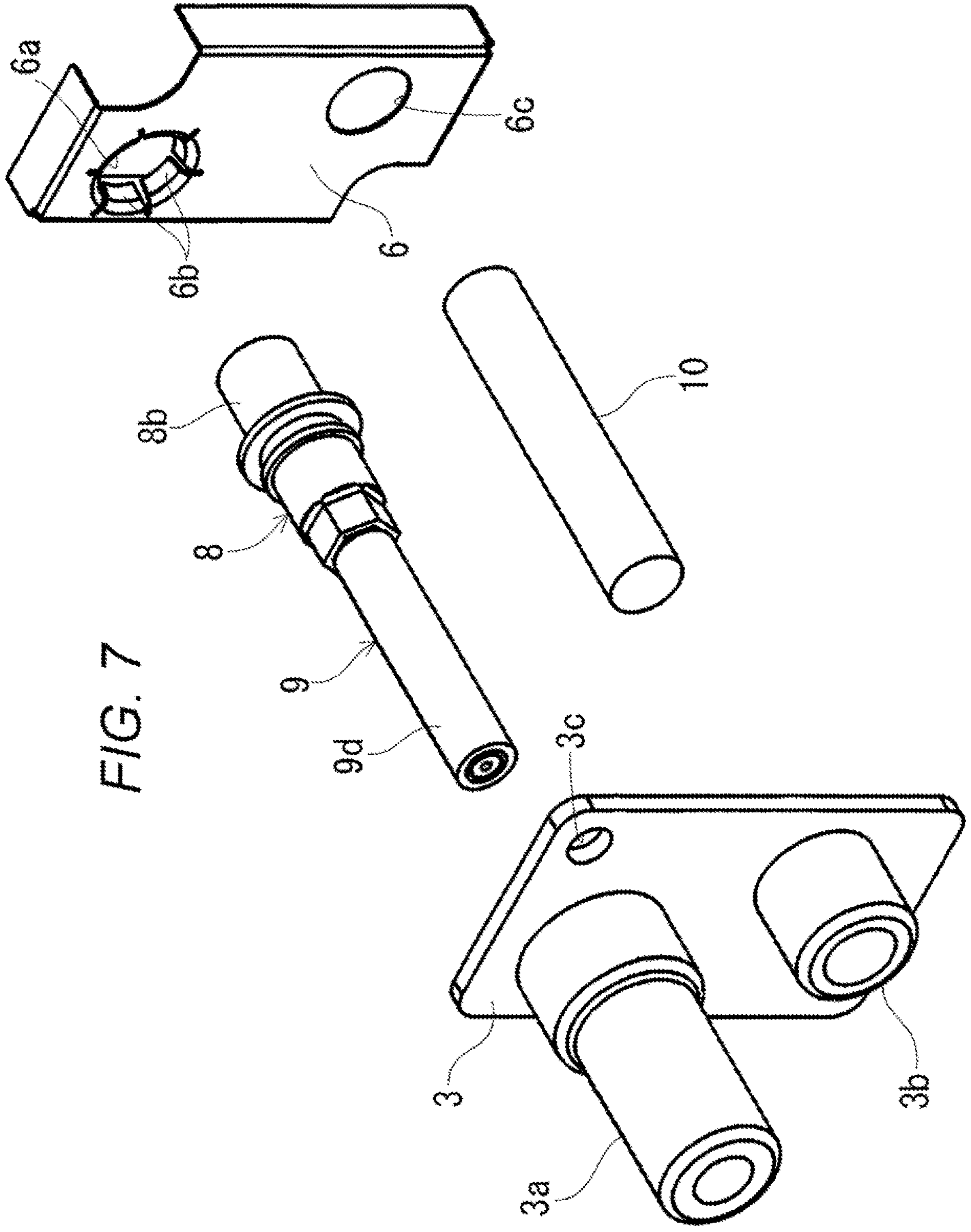
FIG. 7 is a perspective view illustrating the structure on the second case side illustrated in FIG. 4 in a disassembled state.

The screw insertion holes 3*c* are provided at two positions of the right obliquely upper corner and the left obliquely lower corner from the center of the rear case 3 in FIG. 2, and the screw holes 2*b* are provided at two positions of the right obliquely upper corner and the left obliquely lower corner from the center of the front case 2 in FIG. 4 corresponding to the screw insertion holes 3*c*.

The connector according to the embodiment of the present invention includes the receptacle 7 attached to the rear substrate 5 accommodated in the front case 2, and the plug 8 attached to one end of the coaxial cable 9, integrated with the rear case 3 assembled to the front case 2, and fitted to the receptacle 7. The separate cable 10 different from the coaxial cable 9 integrated with the rear case 3 together with the plug 8 is integrated with the rear case 3. As a result, the connector according to the embodiment enables the product variations and complex use while effectively utilizing an existing structure and reducing costs, and thus can enhance versatility. For example, in addition to a camera module that transmits a video signal, a power supply, and a synchronization control signal by only one coaxial cable 9, a camera module that transmits a power supply by a separate wire (the separate cable 10) can also be supported. Further, when an infrared camera module is used, a power supply for LED can be supplied by the separate cable 10.

In the connector according to the embodiment of the present invention, the plug 8 is integrated at a position eccentric from the center of the rear case 3. As a result, the receptacle 7 can be attached to near the end of the rear substrate 5 to increase a degree of freedom in substrate design, and this can contribute to downsizing of the rear substrate 5, downsizing of the front case 2 and the rear case 3, and downsizing of the in-vehicle camera (device) 1. Further, a large space is provided in a direction opposite to the plug eccentric direction from the center of the rear case 3, and the separate cable 10 can be integrated while an increase in size of the rear case 3 is prevented. This can contribute to prevent or reduce an increase in size of the front case 2 and the rear case 3 and an increase in size of the in-vehicle camera (device) 1.

In the connector according to the embodiment of the present invention, the rear case 3 is provided with two screw insertion holes 3*c* through which two screws that fasten the rear case 3 to the front case 2 are inserted. The diameter of the screw insertion holes 3*c* is smaller than the diameter of the head of the screws, and is larger than the diameter of the two screw holes 2*b* provided in the front case 2 and with which the screws are screwed while being inserted through the screw insertion holes 3*c*. As a result, even when slight misalignment occurs between the front case 2 and the rear case 3 due to fitting between the receptacle 7 and the plug 8, the rear case 3 can be assembled to the front case 2 while allowing the misalignment.

As described above, the connector according to the embodiment of the present invention makes it possible to provide a connector that can easily meet market requirements for enabling product variations and complex use.

Modification

Figure 8:
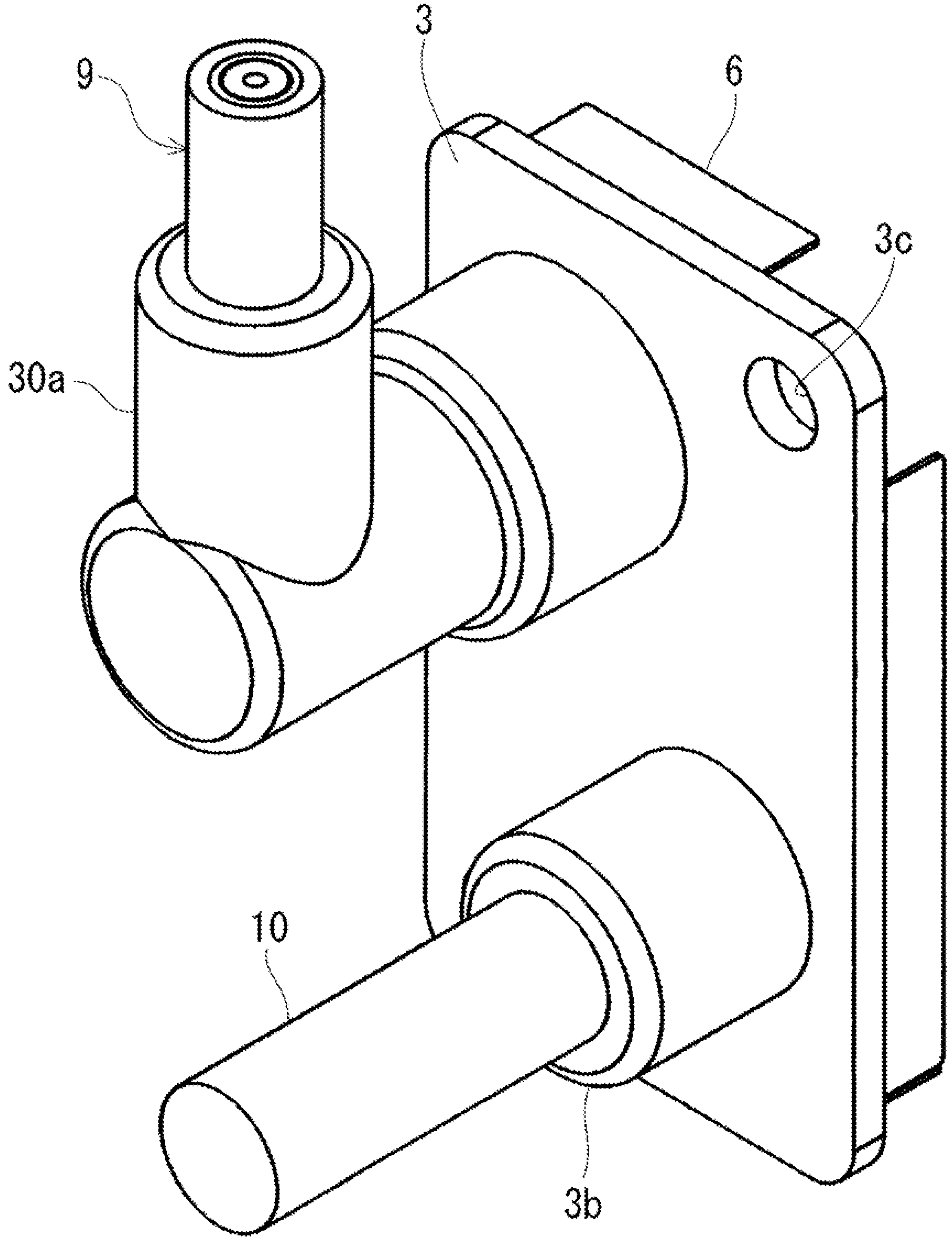
FIG. 8 is a perspective view illustrating a modification of the connector according to the embodiment of the present invention.

In the connector according to the embodiment of the present invention, the straight cylindrical first molded portion 3*a* for pulling out the coaxial cable 9 straight from the rear surface of the rear case 3 toward the rear side is integrally formed with the rear case 3. However, as illustrated in FIG. 8, instead of the straight cylindrical first molded portion 3*a*, an L-shaped first molded portion 30*a* bent in an L shape may be integrally formed, and the coaxial cable 9 may be pulled out from the rear surface of the rear case 3 in a direction orthogonal to the rear substrate 5 (direction orthogonal to a connector fitting direction). In an illustrated example, the L-shaped first molded portion 30*a* has a distal end bent and opened upward such that the coaxial cable 9 is pulled out upward, but may have a distal end bent and opened downward, leftward, or rightward such that the coaxial cable 9 is pulled out downward, leftward, or rightward.

Figure 9:
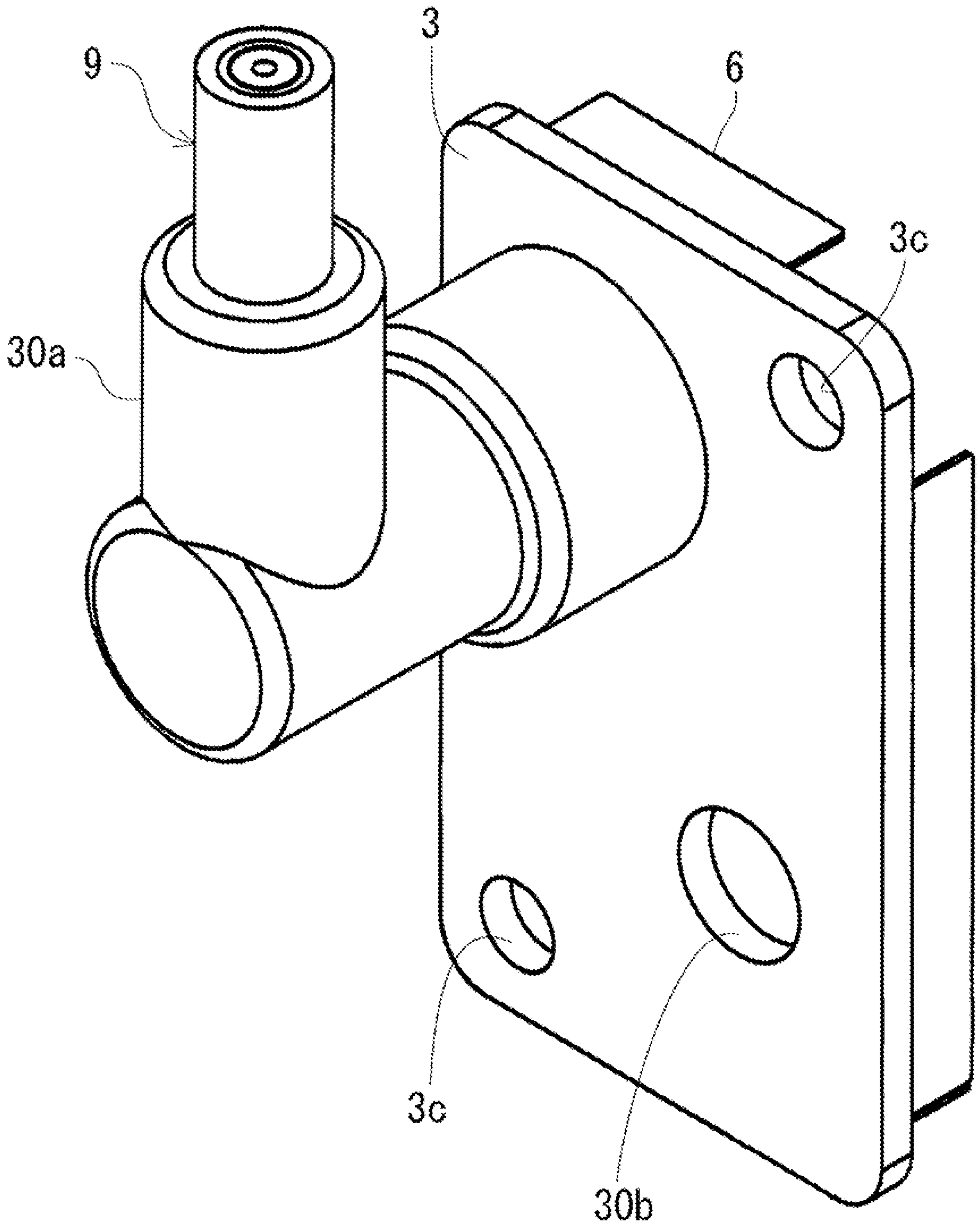
FIG. 9 is a perspective view illustrating another modification of the connector according to the embodiment of the present invention.

In the connector according to the embodiment of the present invention, the plug 8 attached to one end of the coaxial cable 9 (the cable 9 with the plug 8) and the separate cable 10 are integrated with the rear case 3 by insert molding. However, only the plug 8 attached to one end of the coaxial cable 9 (the cable 9 with the plug 8) may be integrated with the rear case 3 by insert molding, and the separate cable 10 may be integrated by being inserted and fixed to an opening 30*b* formed in the rear case 3 during the insert molding by an adhesive, welding, potting, or the like in a later step as illustrated in FIG. 9. This is effective when the coaxial cable 9 is pulled out from the rear surface of the rear case 3 in the direction orthogonal to the rear substrate 5. Alternatively, the separate cable 10 may be integrally inserted and fixed to the opening 30*b* using a separate component. For example, a fixing method may be adopted in which a packing is inserted into the separate cable 10 in advance, and the separate cable 10 is press-fitted into the opening 30*b* together with the packing.

In the connector according to the embodiment of the present invention, the number of separate cables 10 integrated with the rear case 3 is one, but may be plural. In a case where the separate cable 10 is provided with a plug, the separate cable 10 may be integrated with the plug similarly to the coaxial cable 9 (with the plug 8).

In the connector according to the embodiment of the present invention, the rear case 3 has a rectangular plate shape, but may be provided with a side wall extending from a peripheral edge of the rear case 3 toward the front case 2.

In the connector according to the embodiment of the present invention, the front substrate 4 and the rear substrate 5 may be electrically connected via a board-to-board connector (B to B connector) in addition to the FPC.

In the connector according to the embodiment of the present invention, the two substrates of the front substrate 4 and the rear substrate 5 are provided, but may be provided as one substrate. For example, on one substrate, an imaging element may be mounted, a lens member may be attached, an electronic circuit may be formed, and the receptacle 7 may be mounted.

In the connector according to the embodiment of the present invention, the rear shield case 6 constitutes a rectangular parallelepiped shield case surrounding the camera module in the camera case with the front shield case (not illustrated) when the plug 8 is fitted to the receptacle 7. However, the front case 2 including a resin may be replaced with a metal case to have shielding properties, and the front case 2 and the rear shield case 6 may be electrically connected to a substrate ground when the plug 8 is fitted to the receptacle 7. Alternatively, only a shield member (for example, the rear shield case 6) joined to the rear case 3 may be provided, and the shield member may be connected to the substrate ground when the plug 8 is fitted to the receptacle 7.

In the connector according to the embodiment of the present invention, the front case 2 to which the rear case 3 is assembled is configured as an integral body, but may be configured by combining a plurality of case components.

As described above, the present invention can provide a connector that can easily meet market requirements for enabling product variations and complex use, and is useful for a connector, particularly a connector suitable for an in-vehicle camera.

What is claimed is:

1. A connector comprising:

a receptacle attached to a substrate accommodated in a first case;

a cable, said cable being a coaxial cable;

a second case comprising a rear shield; and a plug attached to one end of the cable, integrated with the second case, and fitted to the receptacle when the second case is assembled to the first case;

wherein:

the first case and the second case constitute one case when the second case is assembled to the first case and the first case has internal space where the substrate is accommodated and an opening for accommodating the substrate from the outside into the internal space, the second case is assembled to the first case to close the opening of the first case;

the rear shield is electrically connected to a conductive shell of the plug and is electrically connected to an outer contact of the receptacle via the conductive shell of the plug by fitting the plug to the receptacle when the plug is fitted to the receptacle as the second case is assembled to the first case to close the opening of the first case:

the plug is attached to one end of the second case;

a separate cable, different from the cable, is integrated with the second case, said separate cable being a power supply cable; and the plug is not capable of being attached to the separate cable; and the plug and the one end of the cable are integrated with the second case by insert molding.

2. The connector according to claim 1, wherein the plug is integrated at a position eccentric from a center of the second case.

3. The connector according to claim 1, wherein the second case is provided with a plurality of screw insertion holes through which a plurality of screws that fasten the second case to the first case are inserted, and the screw insertion holes have a diameter that is smaller than a diameter of heads of the screws and is larger than a diameter of a plurality of screw holes provided in the first case and with which the screws are screwed while being inserted through the screw insertion holes.

4. The connector according to claim 1, wherein the plug is integrated at a position eccentric from a center of the second case, the second case is provided with a plurality of screw insertion holes through which a plurality of screws that fasten the second case to the first case are inserted, and the screw insertion holes have a diameter that is smaller than a diameter of heads of the screws and is larger than a diameter of a plurality of screw holes provided in the first case and with which the screws are screwed while being inserted through the screw insertion holes.

5. The connector according to claim 2, wherein the second case is provided with a plurality of screw insertion holes through which a plurality of screws that fasten the second case to the first case are inserted, and the screw insertion holes have a diameter that is smaller than a diameter of heads of the screws and is larger than a diameter of a plurality of screw holes provided in the first case and with which the screws are screwed while being inserted through the screw insertion holes.

* * * * *